(12) United States Patent
Okada

(10) Patent No.: US 8,717,598 B2
(45) Date of Patent: May 6, 2014

(54) PRINT APPARATUS AND METHOD OF CONTROLLING THE APPARATUS AND PROGRAM THEREOF

(75) Inventor: Hideyuki Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 866 days.

(21) Appl. No.: 12/744,324

(22) PCT Filed: Mar. 31, 2010

(86) PCT No.: PCT/JP2010/056268
§ 371 (c)(1),
(2), (4) Date: May 21, 2010

(87) PCT Pub. No.: WO2010/131532
PCT Pub. Date: Nov. 18, 2010

(65) Prior Publication Data
US 2011/0063657 A1 Mar. 17, 2011

(30) Foreign Application Priority Data
May 11, 2009 (JP) ................................ 2009-114978

(51) Int. Cl.
*G06F 3/12* (2006.01)
(52) U.S. Cl.
USPC ........... 358/1.15; 358/1.1; 358/1.9; 358/1.13; 399/82
(58) Field of Classification Search
None
See application file for complete search history.

(56) References Cited

U.S. PATENT DOCUMENTS

| 7,206,087 B2 * | 4/2007 | Ryan et al. | 358/1.15 |
| 7,777,907 B2 * | 8/2010 | Anno et al. | 358/1.15 |
| 7,982,888 B2 * | 7/2011 | Yamada et al. | 358/1.13 |

(Continued)

FOREIGN PATENT DOCUMENTS

| JP | 2002-337432 A | 11/2002 |
| JP | 2005-329623 A | 12/2005 |
| JP | 2006-209249 A | 8/2006 |
| JP | 2007-111935 A | 5/2007 |

OTHER PUBLICATIONS

PCT International Search Report and Written Opinion of the International Searching Authority, mailed May 25, 2010, in PCT/JP2010/056268.

*Primary Examiner* — Ashish K Thomas
(74) *Attorney, Agent, or Firm* — Fitzpatrick, Cella, Harper & Scinto

(57) ABSTRACT

The present invention provides a print apparatus and a method of controlling the print apparatus for receiving and processing a job including a setting for post-processing for printed sheets printed in the print process. The print apparatus determines whether or not there is an unexecutable post-processing in a plurality of types of post-processes set for the received job, and if there is the unexecutable post-processing, information for executing a print process corresponding to the unexecutable post-process and the unexecutable post-process is stored in a holding unit. An executable post-process of the plurality of types of post-processes set for the received job is identified, and a print process corresponding to the executable post-process and the executable post-process are executed prior to a print process corresponding to the unexecutable post-process and the unexecutable post-process.

8 Claims, 13 Drawing Sheets

(56) References Cited

U.S. PATENT DOCUMENTS

| | | | | |
|---|---|---|---|---|
| 8,171,503 B2* | 5/2012 | Wakana | | 719/321 |
| 8,190,049 B2* | 5/2012 | Tanaka | | 399/82 |
| 8,289,539 B2* | 10/2012 | Koga | | 358/1.15 |
| 8,300,236 B2* | 10/2012 | Saitoh et al. | | 358/1.13 |
| 2004/0190057 A1 | 9/2004 | Takahashi et al. | | |
| 2005/0157315 A1* | 7/2005 | Kato | | 358/1.1 |
| 2006/0171002 A1* | 8/2006 | Mori | | 358/538 |
| 2007/0127064 A1* | 6/2007 | Kuroshima | | 358/1.15 |
| 2010/0002252 A1* | 1/2010 | Yamaguchi et al. | | 358/1.15 |
| 2010/0033744 A1* | 2/2010 | Maeda | | 358/1.9 |

* cited by examiner

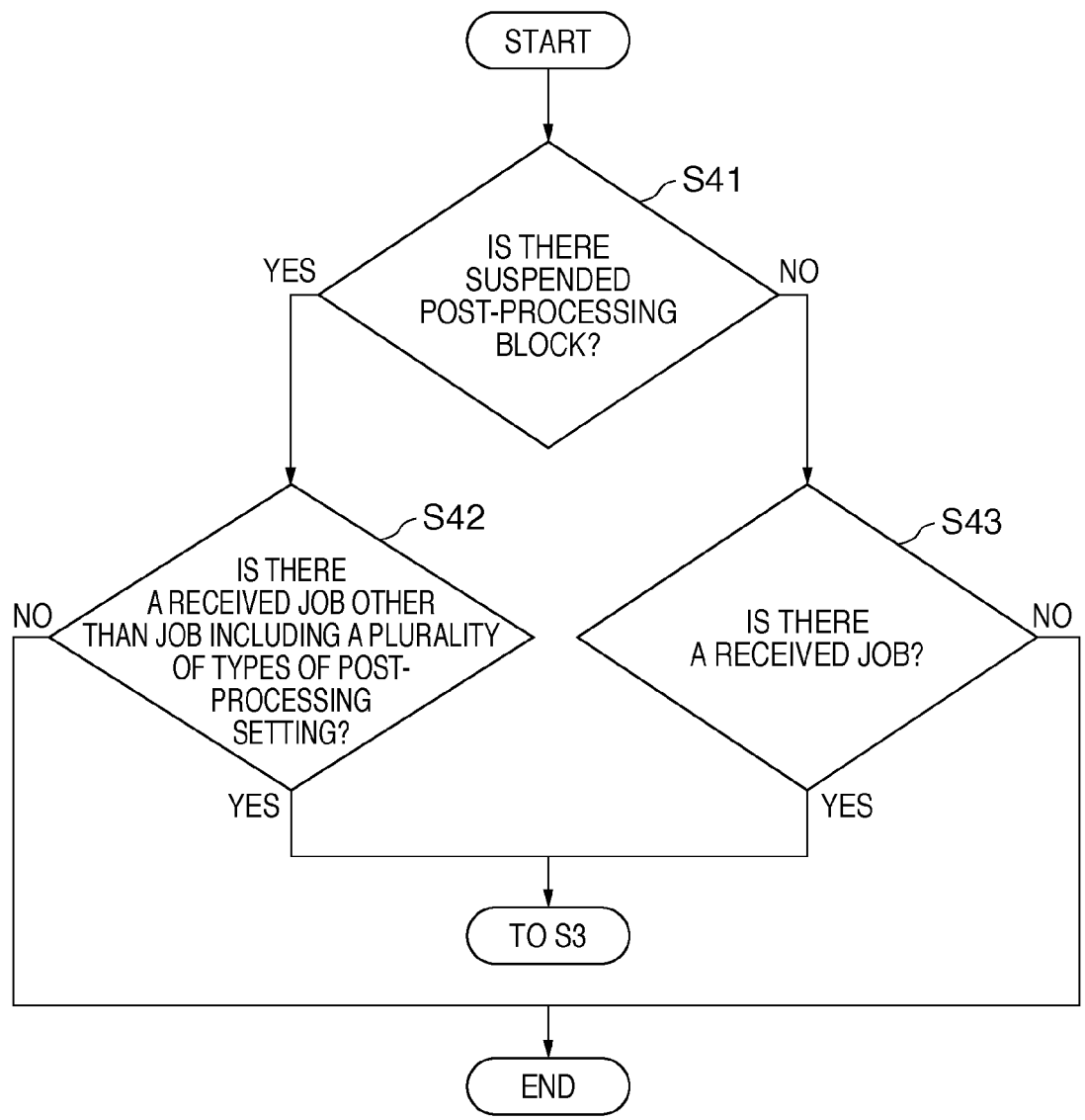

PRINT APPARATUS AND METHOD OF CONTROLLING THE APPARATUS AND PROGRAM THEREOF

TECHNICAL FIELD

The present invention relates to a print apparatus, a method of controlling the apparatus, and a program thereof.

BACKGROUND ART

As opposed to the conventional printing industry, a POD (Print On Demand) system using a printing apparatus of an electrophotographic method or a printing apparatus of an ink-jet method has been proposed in recent years (US2004/0190057). According to such a POD print system, an offset plate making process and other complicated operations, which are required in the conventional printing industry, are not necessary.

However, more examination may be necessary to put the POD print system product into practical use. For example, conventionally, if post-processing set to a print job cannot be executed for some reason, there is a problem in that the entire system runs down due to early stages of print processing also being suspended. Consequently, a promote function is proposed, in which even if there is a job terminated for some reasons, an executable job is carried out after suspending the terminated job if there is an executable job.

However, a plurality of types of post-processing may be applied to a product (printed matter or printed matter to which a stapling or punching process, case binding, glue binding, etc. is applied). For example, there are stapled printed matters, case-bound printed matters, and Z-folded printed matters, and the matters are put together and put in a binder, etc. to be used as a learning tool, etc. in many cases. It is preferable to be able to set a plurality of types of post-processing to one job to output a product to which the plurality of post-processes are applied. However, only job-by-job operations can be handled in the conventional promote function, and an optimal process cannot be executed to perform the job.

SUMMARY OF INVENTION

An aspect of the present invention is to eliminate the above-mentioned problems with the conventional technology.

An aspect of the present invention is to provide a print apparatus and a method of controlling the apparatus capable of giving a priority to an executable post-processing to execute the executable post-processing other than unexecutable post-processing among a plurality of types of post-processing set to a job.

According to an aspect of the present invention, there is provided a print apparatus comprising: reception means for receiving a job including a setting for a plurality of types of post-processes applied to printed sheets printed by the print process; determination means for determining whether or not there is an unexecutable post-processing in the plurality of types of post-processes set for the job received by the reception means; and if the determination means determines that there is the unexecutable post-processing, control means for holding, in a holding unit, information for executing a print process corresponding to the unexecutable post-process and the unexecutable post-process, identifying an executable post-process in the plurality of types of post-processes set for the job received by the reception means and controlling to execute a print process corresponding to the executable post-process and the executable post-process prior to the print process corresponding to the unexecutable post-process and the unexecutable post-process.

According to another aspect of the present invention, there is provided a method of controlling a print apparatus, comprising: a reception step of receiving a job including a setting for a plurality of types of post-processes applied to printed sheets printed by the print process; a determination step of determining whether or not there is an unexecutable post-processing in the plurality of types of post-processes set for the job received in the reception step; and if it is determined in the determination step that there is the unexecutable post-processing, a control step of holding, in a holding unit, information for executing a print process corresponding to the unexecutable post-process and the unexecutable post-process, identifying an executable post-process in the plurality of types of post-processes set for the job received in the reception step, and controlling to execute a print process corresponding to the executable post-process and the executable post-process prior to the print process corresponding to the unexecutable post-process and the unexecutable post-process.

Further features and aspects of the present invention will become apparent from the following description of exemplary embodiments, with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 14 is a flow chart describing a job reception process according to the second embodiment.

DESCRIPTION OF EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
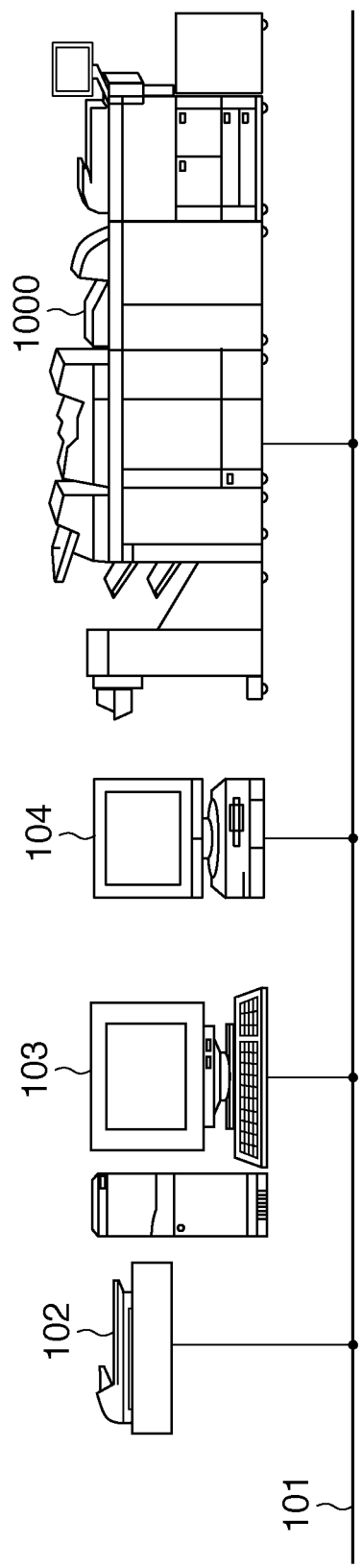
FIG. 1 is a diagram showing a configuration of a POD system according to an embodiment of the present invention.

FIG. 1 is a diagram showing a configuration of a POD system according to an embodiment of the present invention.

The POD system comprises a print system 1000, a scanner 102, a server computer (PC) 103, and a client computer (PC) 104, which are connected through a network 101.

Figure 2:
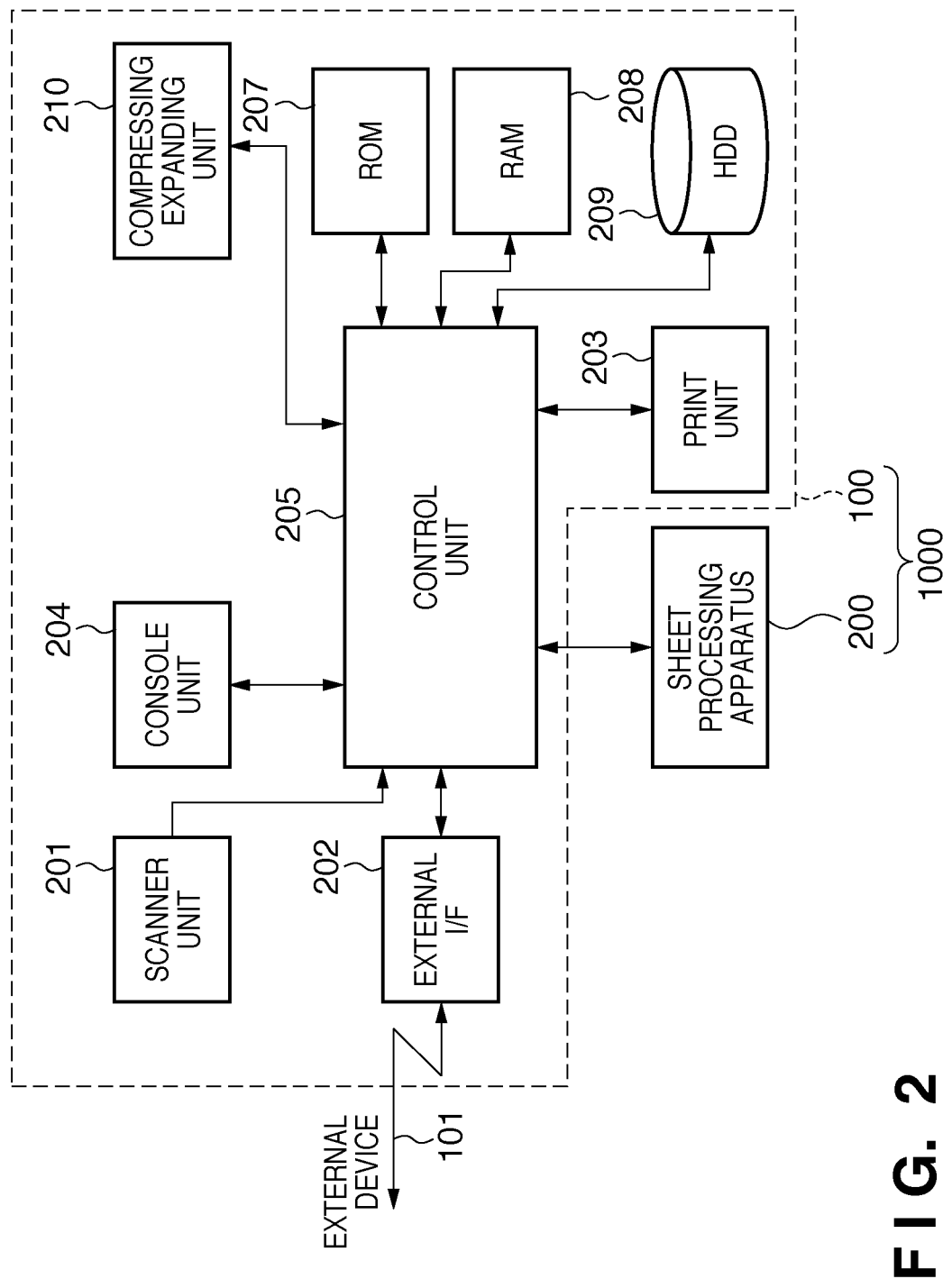
FIG. 2 is a block diagram showing a configuration of a print system according to the present embodiment.

FIG. 2 is a block diagram showing a configuration of the print system 1000 according to the present embodiment.

The print system 1000 comprises a print apparatus 100 and a sheet processing apparatus 200. In the present embodiment, a multifunction peripheral (MFP) having a plurality of functions, such as a copy function and a printer function, will be described as an example of the print apparatus 100. However, the print apparatus 100 may be a single-function print apparatus only having a printer function or a printer having a copy function. The PC 103 manages transmission and reception of data to and from various apparatuses connected to the network 101. The PC 104 transmits image data to the print apparatus 100 and the PC 103 through the network 101.

The configuration of the print system 1000 will now be described with reference to the block diagram of FIG. 2. The print apparatus 100 includes units other than the sheet processing apparatus 200 among the units shown in FIG. 2 included in the print system 1000. An arbitrary number of sheet processing apparatuses 200 can be connected to the print apparatus 100.

In the print system 1000, the sheet processing apparatus 200 connected to the print apparatus 100 can apply sheet processing to sheets printed by the print apparatus 100. However, only the print apparatus 100 can constitute the print system 1000, without the sheet processing apparatus 200 being connected. The sheet processing apparatus 200 can communicate with the print apparatus 100 and execute sheet processing described below in response to an instruction from the print apparatus 100. A scanner unit 201 reads an image on a document, converts the image into image data, and transfers the image data to another unit. An external I/F 202 transmits and receives data to and from other apparatuses connected to the network 101. A print unit 203 prints an image based on inputted image data to a sheet. A console unit 204 includes a hard key input unit (key input unit) 402 and a touch panel unit 401 described below with reference to FIG. 3 and receives an instruction from a user through the hard key input unit 402 and the touch panel unit 401. The console unit 204 also performs various displays on the touch panel unit 401 (FIG. 3) included in the console unit 204.

A control unit 205 comprehensively controls processes, operations, etc. of various units included in the print system 1000. More specifically, the control unit 205 controls operations of the print apparatus 100 and the sheet processing apparatus 200 connected to the print apparatus 100. A ROM 207 stores various computer programs executed by the control unit 205. For example, the ROM 207 stores programs causing the control unit 205 to execute various processes of the flow charts described below and display control programs necessary to display various setting screens described below. The ROM 207 also stores programs causing the control unit 205 to execute operations of interpreting PDL (page description language) code data received from the PC 103, the PC 104, etc. and rendering the code data into raster image data. Furthermore, the ROM 207 stores a boot sequence, font information, etc. A RAM 208 stores image data transmitted from the scanner unit 201 and the external I/F 202, various programs loaded from the ROM 207, setting information, etc. The RAM 208 also stores information related to the sheet processing apparatus 200 (information related to the number (0 to n) of the sheet processing apparatuses 200 connected to the print apparatus 100 and functions of the sheet processing apparatuses 200, the order of connection of the sheet processing apparatuses 200, and so forth). An HDD (hard disk drive) 209 is constituted by a hard disk, a driving unit that reads and writes data to and from the hard disk, etc. The HDD 209 is a high-capacity storage device storing image data inputted from the scanner unit 201 and the external I/F 202 and compressed by a compressing expanding unit (CODEC) 210. Based on an instruction from the user, the control unit 205 can cause the print unit 203 to print an image based on the image data stored in the HDD 209. The HDD 209 is also used as a spooler, and the control unit 205 can manage image data received from the PC 103, the PC 104, etc. as well as PDL code data as jobs and can store the jobs in the HDD 209. The control unit 205 can also manage the jobs stored in the HDD 209 and acquire the number of stored jobs and setting information set to the jobs. A compressing expanding unit (codec) 210 executes a compression/expansion operation of image data, etc. stored in the RAM 208 and the HDD 209 by various compression methods, such as JBIG (Joint Bi-level Image Experts Group) and JPEG (Joint Photographic Experts Group).

Figure 3:
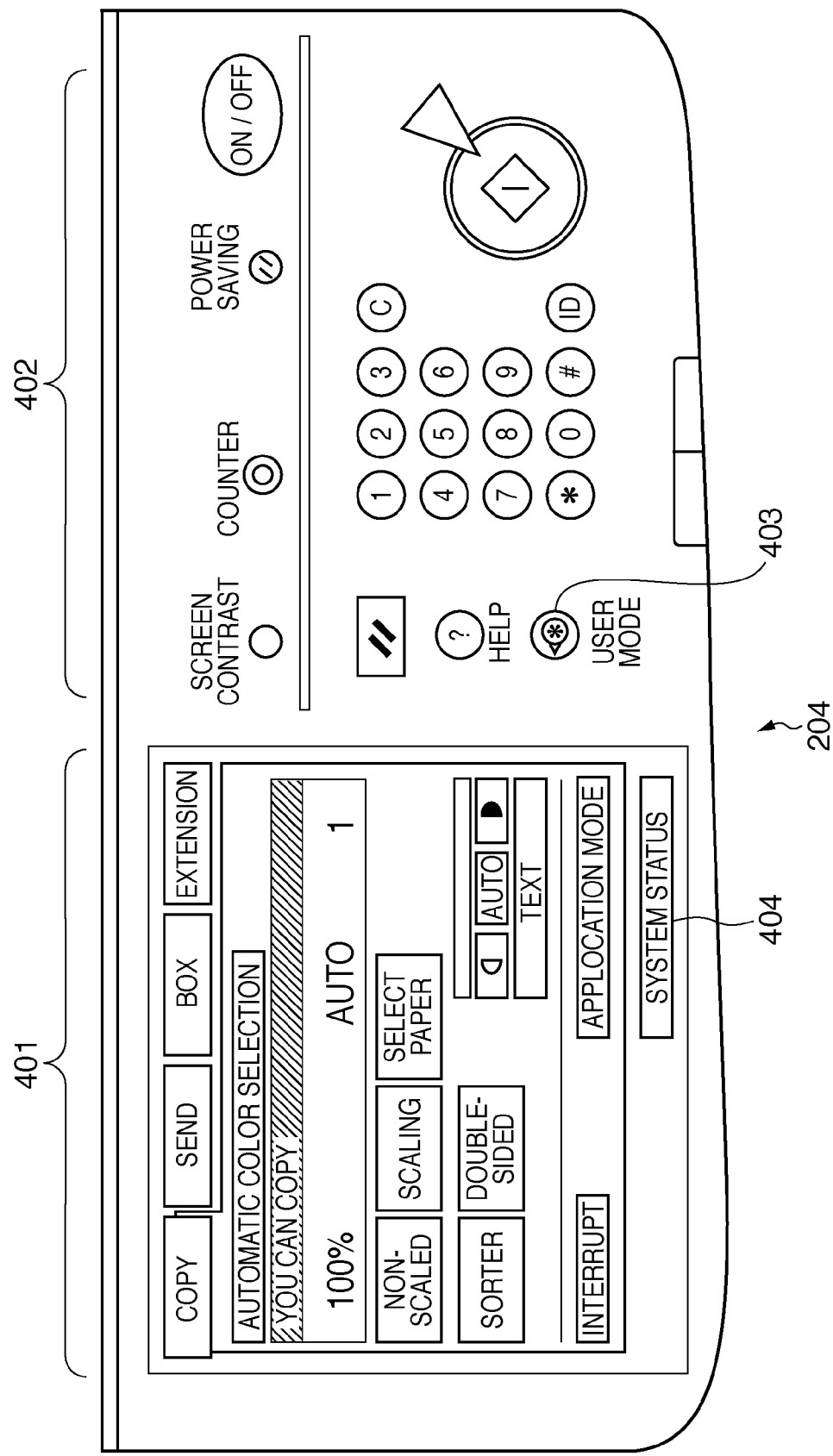
FIG. 3 depicts a top view illustrating an example of a console unit according to the present embodiment.

FIG. 3 depicts a top view illustrating an example of the console unit according to the present embodiment.

The console unit 204 comprises a hard key input unit (key input unit) 402 and a touch panel unit 401. The touch panel unit 401 displays various user interfaces such as a menu screen. Reference numeral 403 denotes a user mode button, and when the button 403 is pressed, the touch panel unit 401 displays a screen for performing system setting in relation to the print system 1000. Reference numeral 404 denotes a system status button, and when the button is pressed, the touch panel unit 401 displays the current system status.

Figure 4:
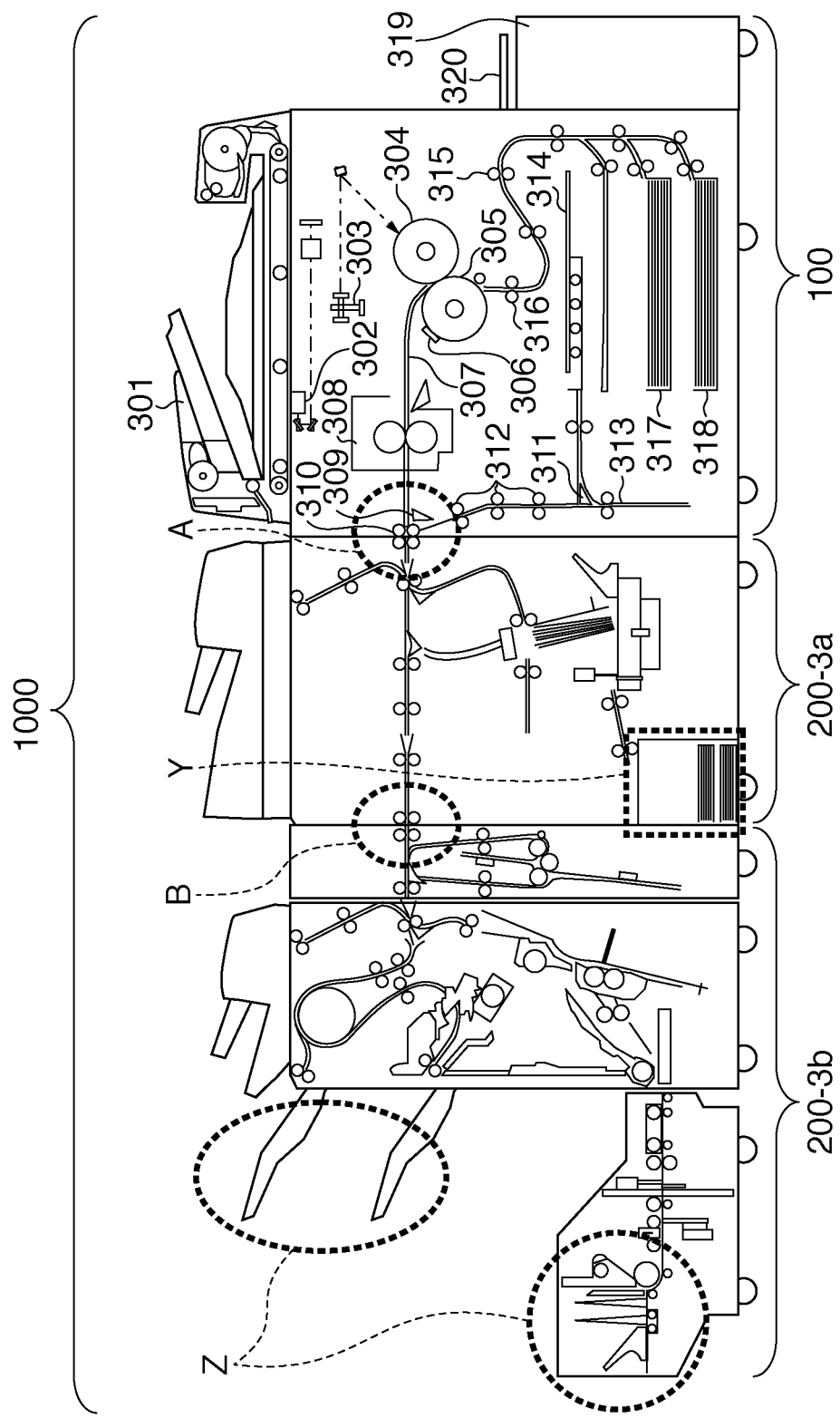
FIG. 4 depicts a cross-sectional view illustrating a configuration of the print system according to the present embodiment.

FIG. 4 depicts a cross-sectional view showing a configuration of the print system 1000 according to the present embodiment. FIG. 4 shows a cross section of the print apparatus 100 and the sheet processing apparatuses 200 (glue binding apparatus 200-3a and saddle stitching apparatus 200-3b) connected to the print apparatus 100.

An automatic document feeder (ADF) 301 separates documents set on the loading surface of a document tray, sequentially from the first document of the documents, and feeds the document onto a platen glass for scanning by a scanner 302. The scanner 302 reads an image on the document fed to the platen glass and coverts the image into image data by a CCD. A rotating polygonal mirror (such as a polygon mirror) 303 reflects a light beam, such as a laser beam, which is modulated in accordance with the image data, and the light beam serves as scan light for irradiating a photosensitive drum 304. As a result, an electrostatic latent image is formed on the photosensitive drum 304 in accordance with the image data. The latent image is developed by a toner and transferred to a sheet attached on a transfer drum 305. The series of image forming processes is sequentially executed for yellow (Y), magenta (M), cyan (C), and black (K) toners to form a full-color image. After these four image forming processes, a separation pawl 306 separates the sheet on the transfer drum 305, on which the full-color image is formed, and the sheet is conveyed to a fixing unit 308 through a pre-fixing conveyance path 307. The fixing unit 308 is constituted by a combination of rollers and belts, and a heat source such as a halogen heater is included. The fixing unit 308 uses heat and pressure to melt and fix the toners on the sheet on which the toner image is transferred. A discharge flapper 309, capable of oscillating around an oscillation axis, defines the conveyance direction of the sheet. The sheet is straightly conveyed when the discharge flapper 309 oscillates clockwise in FIG. 4, and a discharge roller 310 discharges the sheet outside the apparatus. The control unit 205 (FIG. 2) controls the print apparatus 100 to execute one-sided printing based on the series of sequences.

Meanwhile, to form images on both sides of the sheet, the discharge flapper 309 oscillates counterclockwise in FIG. 4. The sheet changes the course downward, and the sheet is fed to a double-sided feed path. The double-sided feed path comprises a reversing flapper 311, reversing rollers 312, a reversing guide 313, and a tray for double-sided printing 314. The reversing flapper 311 oscillates around the oscillation axis and defines the conveyance direction of the sheet. To process a double-sided print job, the control unit 205 controls the reversing flapper 311 to oscillate counterclockwise in FIG. 4 to feed the sheet, on which the print unit 203 has printed an image on a first surface of the sheet, to the reversing guide 313 through the reversing rollers 312. The control unit 205 temporarily terminates the reversing rollers 312 with the back end of the sheet being held between the reversing rollers 312. The control unit 205 then causes the reversing flapper 311 to oscillate clockwise in FIG. 4 and causes the reversing rollers 312 to rotate in the opposite direction. As a result, the sheet is switched back and conveyed, and the control unit 205 controls to deliver the sheet to the tray for double-sided printing 314 with a trailing edge and a leading edge of the sheet being switched. The tray for double-sided printing 314 temporarily loads the sheet, and a paper re-feeding roller 315 transfers the sheet again to a registration roller 316. At this point, the sheet is transferred, with the surface opposite the transfer process of the first surface facing the photosensitive drum 304. An image of a second surface is then formed on the second surface of the sheet in the same way as the process described above. Images are formed on both sides of the sheet, and the sheet is discharged outside the apparatus from the main body of the print apparatus 100 through the discharge roller 310 after the fixing process. The control unit 205 controls the print apparatus 100 to perform double-sided printing based on the series of sequences.

The print apparatus 100 also comprises a paper feeding unit that accommodates sheets required for the print process. The paper feeding unit includes paper feed cassettes 317, 318 (capable of accommodating, for example, 500 sheets each), a paper feed deck 319 (capable of accommodating, for example, 5000 sheets), a manual feed tray 320, etc. The paper feed cassettes 317, 318, and the paper feed deck 319 can set various sheets with different sizes and materials by sorting the sheets for each paper feeding unit. Various sheets including special sheets, such as OHP sheets, can be set to a manual feed tray 320. Paper feeding rollers are arranged on the paper feed cassettes 317, 318, the paper feed deck 319, and manual feed tray 320, and the paper feeding rollers consecutively convey the sheets one by one.

Figure 5:
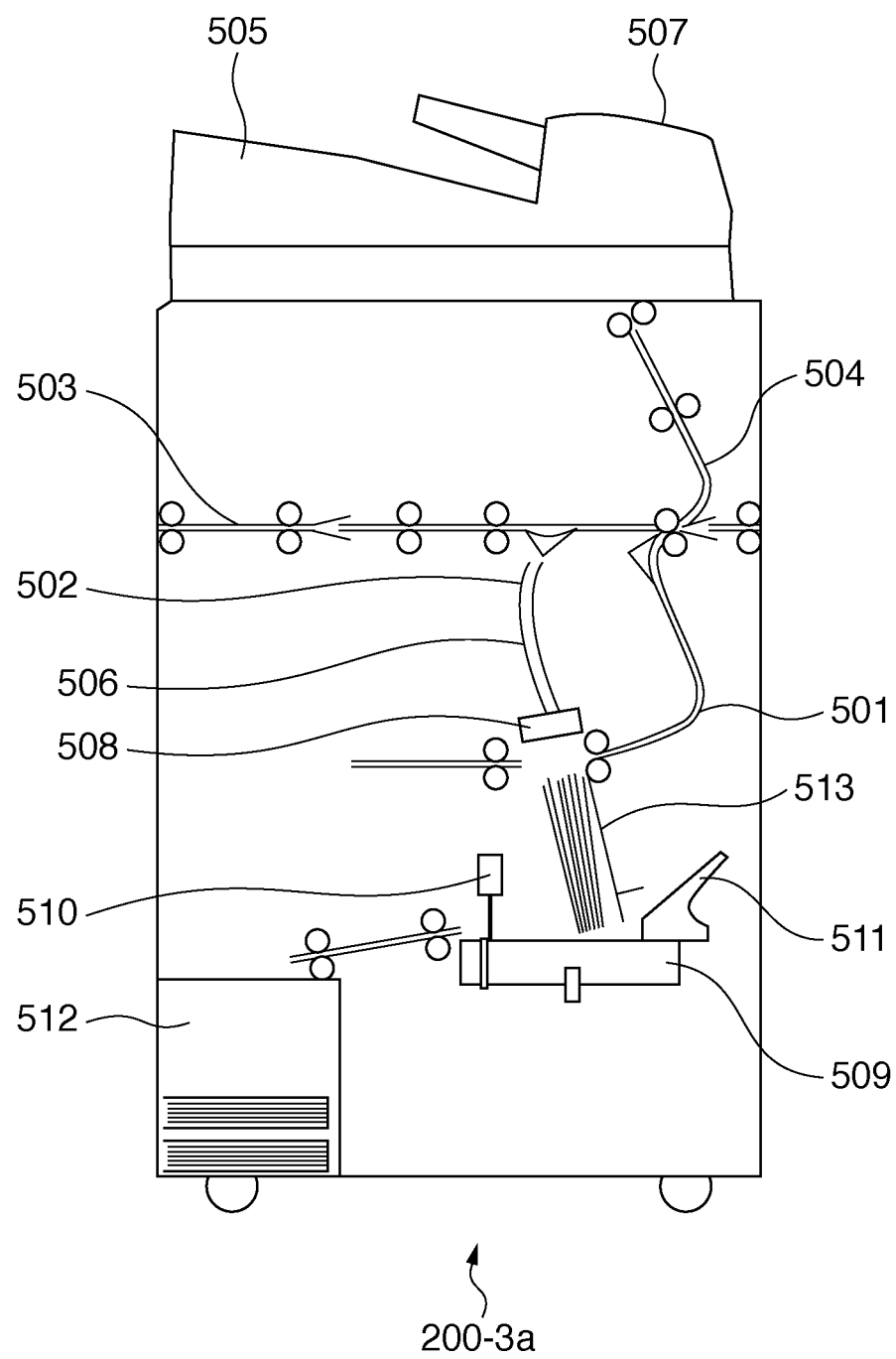
FIG. 5 depicts a cross-sectional view illustrating a configuration of a glue binding apparatus as an example of a sheet processing apparatus.

FIG. 5 depicts a cross-sectional view showing a configuration of the glue binding apparatus 200-3a as an example of the sheet processing apparatus 200 according to the present embodiment.

An arbitrary type and an arbitrary number of sheet processing apparatuses 200 of the print system 1000 according to the present embodiment can be connected, as long as sheets can be conveyed from upstream apparatuses to downstream apparatuses through the sheet conveyance path. For example, as shown in FIG. 4, in the order closer to the print apparatus 100, the glue binding apparatus 200-3a and the saddle stitching apparatus 200-3b are connected, and the apparatuses can be selectively used in the print system 1000. Each of the sheet processing apparatuses 200 comprises a sheet discharging unit, and the user can take out the sheets, to which sheet processing is applied, from the sheet discharging unit of the sheet processing apparatus.

Along with a print execution request inputted in the console unit 204, the control unit 205 receives an execution request of sheet processing of the type desired by the user among the candidates of sheet processing of the types executable by the sheet processing apparatus 200 connected to the print apparatus 100. In response to the reception of the print execution request of the job to be processed, which is inputted by the user through the console unit 204, the control unit 205 causes the print unit 203 to execute a print process necessary for the job. The control unit 205 conveys the sheets printed in the print process to a sheet processing apparatus capable of executing the sheet processing desired by the user through the sheet conveyance path and causes the sheet processing apparatus to execute the sheet processing.

For example, it is assumed that the job for the printed sheet requested by the user is sheet processing by the glue binding apparatus 200-3a when the print system 1000 is configured as shown in FIG. 4. The sheet processing in this case is, for example, one of the glue binding processes, such as a case binding process and a pad binding process. The job will be referred to as a "glue binding job".

To process the glue binding job in the print system of FIG. 4, the control unit 205 conveys the sheets printed by the print apparatus 100 to inside the glue binding apparatus 200-3a through a point A of FIG. 4. The control unit 205 then causes the glue binding apparatus 200-3a to execute the glue binding process of the sheets. The control unit 205 then holds the product after the glue binding process by the glue binding apparatus 200-3a at a discharge destination Y inside the glue binding apparatus 200-3a, without conveying the product to another apparatus (for example, apparatus in later stages).

The process by the glue binding apparatus 200-3a will be described further with reference to FIG. 5.

The glue binding apparatus 200-3a selectively conveys the sheets conveyed from upstream apparatuses to three conveying paths, a front cover sheet path 501, a body sheet path 502, and a straight path 503. The glue binding apparatus 200-3a also includes an inserter path 504. The inserter path 504 is a sheet conveyance path for conveying the sheet placed on an insert tray 505 to the front cover sheet path 501 and the body sheet path 502. The straight path 503 is a sheet conveyance path for conveying the sheets of a job, which do not require the glue binding process by the glue binding apparatus 200-3a, to an apparatus in later stages. The front cover sheet path 501 and the body sheet path 502 are sheet conveyance paths for conveying the sheets necessary to create a product of case binding.

For example, the control unit 205 of the print apparatus 100 performs the following control when an instruction for executing a case binding process using the glue binding apparatus 200-3a is received. The control unit 205 first controls to convey the sheets conveyed from an upstream apparatus to the body sheet path 502 as sheets for main body used in the case binding. When a case-bound product of one volume is created, a sheet bundle of one volume of the sheets for main body is wrapped by one front cover sheet. The sheet bundle for main body in the case binding will be referred to as "body sheets". The control unit 205 then controls to convey the sheet for front cover to be used in the case binding to the front cover sheet path 501. The control unit 205 executes a process of wrapping the conveyed body sheets by the sheet for front cover conveyed through the front cover sheet path 502. The glue binding apparatus 200-3a can not only process the sheet conveyed from an upstream apparatus, but can also individually execute a case binding process or a pad binding process by conveying the sheets placed on the provided insert tray 505.

For example, the control unit 205 causes a stacking unit 506 to sequentially stack the conveyed sheets, which are printed by the print apparatus 100 and which will be the body sheets, through the body sheet path 502 of FIG. 5. The sheets, which will be the body sheets, of an amount equivalent to one volume are stacked on the stacking unit 506. Consequently, the control unit 205 conveys a sheet for front cover required for the job from the insert tray 505 of a provided inserter 507 through the inserter path 504 and the front cover sheet path 501. The control unit 205 controls a gluing unit 508 to apply a gluing process to the back cover sheet part of one set of sheet bundle equivalent to the body sheets. The control unit 205 then controls the gluing unit 508 to bond the back cover sheet part of the body sheets and the center of the front cover sheet. The body sheets are conveyed so that the body sheets are pushed to the lower part of the apparatus to bond the body sheets to the front cover sheet. As a result, a folding process of the front cover sheet is executed to wrap the body sheets by one front cover sheet. The set of sheet bundle is loaded on a rotating platform 509 along a guide 513. After the set of sheet bundle is set on the rotating platform 509, the control unit 205 causes a cutter unit 510 to execute a cutting process of the sheet bundle. At this point, the cutter unit 510 can execute a three-side cutting process of cutting three edges other than the edge equivalent to the back cover sheet part in the set of sheet bundle. The control unit 205 then uses a pushing unit 511 to push out the sheet bundle, to which the three-side cutting process is applied, in the direction of a basket 512 to store the sheet bundle in the basket 512.

Furthermore, for example, it is assumed that a job for the printed sheets requested from the user is a job for executing the sheet processing by the saddle stitching apparatus 200-3b in the print system of FIG. 4. The sheet processing by the saddle stitching apparatus 200-3b includes, for example, saddle stitching, a punching process, a cutting process, a shift discharging process, a folding process, and a stapling process. The job will be referred to as a "saddle stitching job".

To process the saddle stitching job in the print system of FIG. 4, the control unit 205 passes the sheets of the job printed by the print apparatus 100 through the points A and B and conveys the sheets to the saddle stitching apparatus 200-3b. The control unit 205 then causes the saddle stitching apparatus 200-3b to execute the sheet processing of the job. The control unit 205 holds the printed sheets of the saddle stitching job after the sheet processing by the saddle stitching apparatus 200-3b at a discharge destination Z of the saddle stitching apparatus 200-3b. There are a plurality of discharge destination candidates for the discharge destination Z. The candidates are used when the saddle stitching apparatus 200-3b can execute a plurality of types of sheet processing, and the discharge destinations are sorted for each sheet processing.

The process by the saddle stitching apparatus 200-3b will be described further with reference to FIG. 6.

Figure 6:
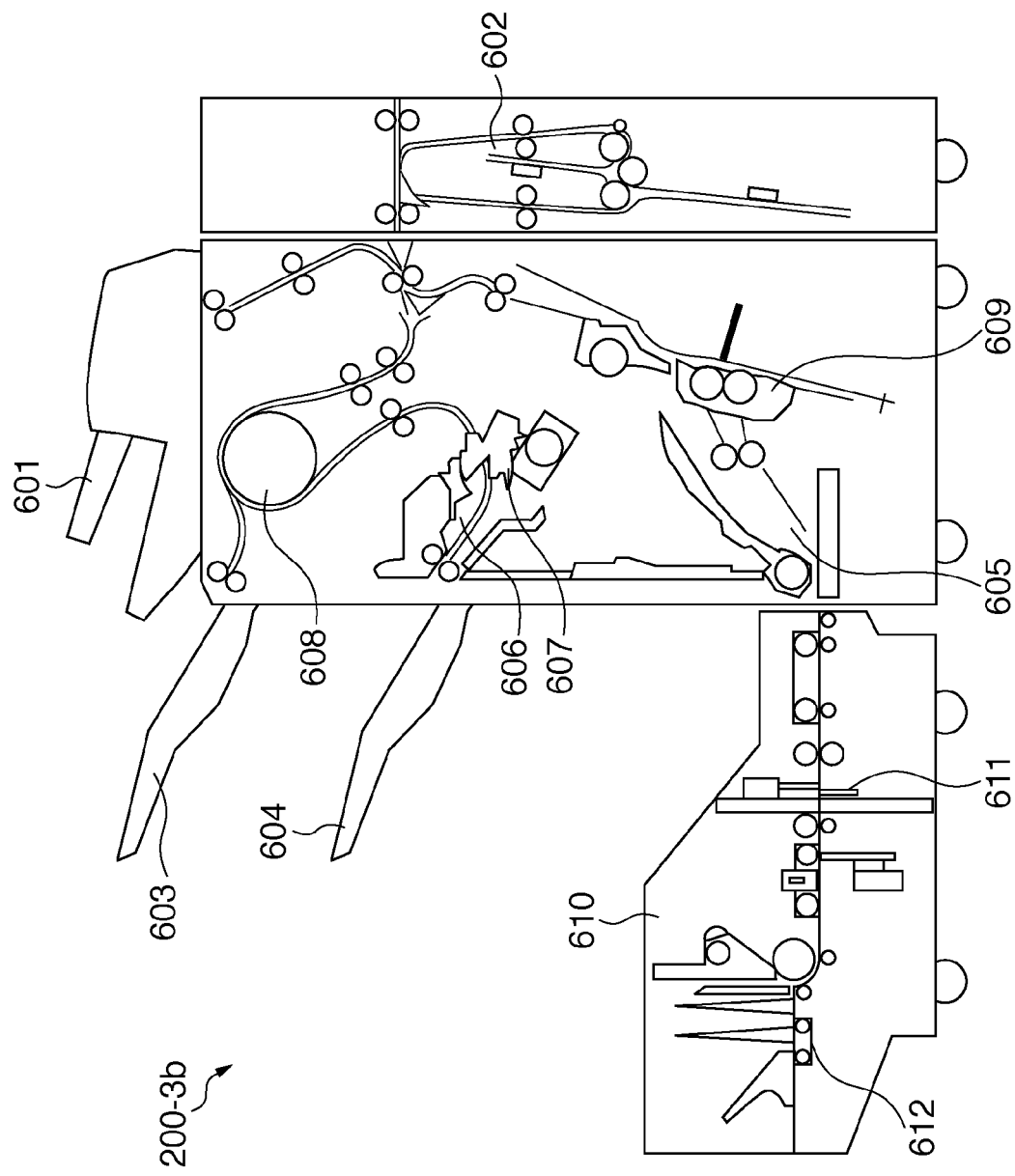
FIG. 6 depicts a cross-sectional view illustrating a configuration of a saddle stitching apparatus as an example of the sheet processing apparatus.

FIG. 6 depicts a cross-sectional view showing a configuration of the saddle stitching apparatus 200-3b as an example of the sheet processing apparatus 200 according to the present embodiment.

The saddle stitching apparatus 200-3b comprises various units that selectively apply a stapling process, a punching process, a cutting process, a saddle stitching process, a Z-folding process, etc. to the sheets conveyed from upstream apparatuses. The saddle stitching apparatus can not only process the sheets conveyed from the upstream apparatuses, but can also convey a sheet (such as a printed cover sheet) set on a provided insert tray 601 to individually execute the stapling process, the punching process, the cutting process, the saddle stitching process, etc. However, the saddle stitching apparatus of FIG. 6 does not include a path for conveying the sheets set on the insert tray 601 to a Z-folding unit 602. Therefore, the saddle stitching apparatus cannot individually realize the Z-folding process. However, the saddle stitching apparatus can convey the sheets conveyed from the upstream to the Z-folding unit 602. Therefore, an inserter, etc. arranged on the sheet processing apparatus connected to the upstream can be used to feed the sheets, and the Z-folding unit 602 can execute the sheet processing.

The saddle stitching apparatus 200-3b does not have a straight path that plays a role of a function of feeding the sheets to an apparatus in later stages. Therefore, when a plurality of sheet processing apparatuses are connected to the print apparatus 100, the saddle stitching apparatus 200-3b can be connected to the back end as shown in FIG. 4. As shown in FIG. 6, the saddle stitching apparatus 200-3b comprises a sample tray 603 as well as a stack tray 604 outside the apparatus and a booklet tray 605 inside the apparatus.

When an instruction for stapling by the saddle stitching apparatus 200-3b is received, the control unit 205 sequentially stacks the conveyed sheets printed by the print apparatus 100 on a processing tray 606. When the sheets equivalent to a bundle are stacked on the processing tray 606, the control unit 205 causes a stapler 607 to perform stapling. The control unit 205 then discharges the stapled sheet bundle from the processing tray 606 to the stack tray 604.

When an instruction for setting the punching process by the saddle stitching apparatus 200-3b is received, the control unit 205 causes a puncher 608 to apply a punch process to the conveyed sheets printed by the print apparatus 100. The control unit 205 then controls the sheets to pass through the saddle stitching apparatus 200-3b to be discharged to a discharge tray, such as the stack tray 604 and the sample tray 603.

When an instruction for executing the saddle stitching process by the saddle stitching apparatus 200-3b is received, the control unit 205 conveys the conveyed sheets printed by the print apparatus 100 to a saddle stitching unit 609. The control unit 205 causes the saddle stitching unit 609 to perform two-part stitching at the center part of the sheet bundle made of a plurality of sheets equivalent to one set. The control unit 205 then causes the saddle stitching unit 609 to engage the center part of the sheet bundle to the rollers to perform half-folding based on the center part of the sheets. As a result, a booklet such as a brochure can be created. Consequently, the sheet bundle, to which the saddle stitching process is applied by the saddle stitching unit 609, can be conveyed to the booklet tray 605.

When an instruction for applying the cutting process to the job, for which an instruction for executing the saddle stitching process is received, is received, the control unit 205 conveys the saddle-stitched sheet bundle from the booklet tray 605 to a trimmer 610. The control unit 205 then causes a cutter unit 611 to cut the sheet bundle conveyed to the trimmer 610 and causes a booklet holding unit 612 to hold the sheet bundle. If the saddle stitching apparatus does not have a trimmer, the sheet bundle bound by the saddle stitching unit 609 can be extracted from the booklet tray 605.

To execute a job, for which an instruction for executing Z-folding by the saddle stitching apparatus is received, the control unit 205 conveys the conveyed sheets printed by the print apparatus 100 to the Z-folding unit 602 to execute a folding process to form a Z-shape. The control unit 205 then controls to pass the folded sheets through the saddle stitching apparatus 200-3b and discharge the sheets to a discharge tray, such as the stack tray 604 and the sample tray 603.

As described with reference to FIGS. 2 to 6, a plurality of sheet processing apparatuses can be connected to the print apparatus 100 in the print system 1000 according to the present embodiment. The plurality of sheet processing apparatuses can be connected to the print apparatus 100 in an arbitrary combination. The order of connection of the plurality of sheet processing apparatuses can be freely changed within the range that the sheet conveyance paths of the apparatuses can be connected. There are also a plurality of types of candidates for the sheet processing apparatuses connectable to the print apparatus 100.

In the present embodiment, various user interfaces, which are provided by the print system 1000 and which can interactively respond to operations of the operator, function to receive the execution requests. The consol unit 204, the soft keys as well as the hard keys included in the console unit 204, and/or various user interface screens shown in the drawings are examples of the user interfaces. The user interfaces are exemplary, and the present invention is not limited to these. For example, an execution request of a job may be received from an external apparatus different from the print system 1000. In that case, a user interface included in an external data source, such as the scanner 102, the PC 103, and the PC 104, has a function of receiving the execution request.

In the present embodiment, a plurality of types of post-processing can be applied to one job through the console unit 204 or a console unit of an external apparatus. For example, in a job for 10 sheets, the stapling process can be set for the first to third sheets, the Z-folding process can be set for the fourth to sixth sheets, and the stapling process can be set for the seventh to tenth sheets. There may also be a sheet for which the post-processing is not set. The control unit 205 holds the set content in the HDD 209. When an execution request by the start key is received, the control unit 205 registers the jobs, for which a plurality of types of post-processing are set, in a queue and sequentially executes the jobs in the order of execution. When the job is executed, the control unit 205 applies the stapling process to the first to third sheets, applies the Z-folding process to the fourth to sixth sheets, and applies the stapling process to the seventh to tenth sheets, based on the setting by the user.

Figure 7:
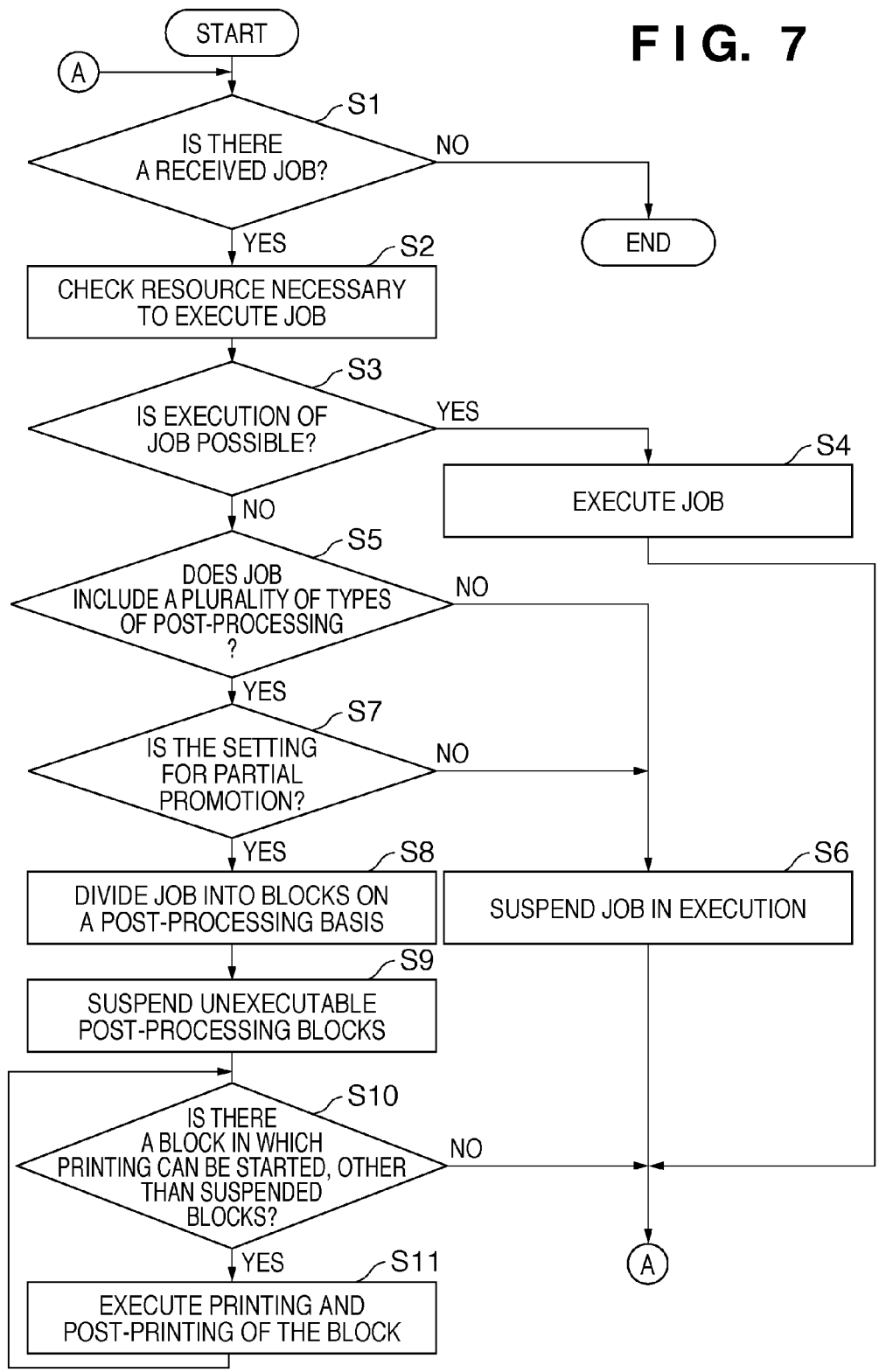
FIG. 7 is a flow chart describing a process implemented by a control unit of a print apparatus of the print system.

FIG. 7 is a flow chart describing a process by the control unit 205 of the print apparatus of the print system 1000 according to the present first embodiment. The program for executing the process is stored in the ROM 207 or installed in the HDD 209. When the program is installed in the HDD 209, the control unit 205 loads the program to the RAM 208 for execution.

In step S1, the control unit 205 determines whether or not there is a received print job. If the control unit 205 determines that there is no print job, the control unit 205 ends the process and waits until the reception of a print job. If the control unit 205 determines that there is a received print job, the process proceeds to step S2 and the control unit 205 checks for a resource necessary to execute the print job. For example, if the stapling process is set in the job, the control unit 205 determines whether or not enough staples are set in the stapler 607 of the saddle stitching apparatus 200-3b and whether or not the stapler 607 can be used. The control unit 205 determines whether or not the post processing can be performed by communicating with a control unit (not shown) included in the saddle stitching apparatus 200-3b. There may be a case in which the control unit 205 determines that the job is unexecutable when a preceding job occupies the sheet processing apparatus. After checking all post-processing for the entire job, the control unit 205 determines in step S3 whether or not the received job can be executed (job execution determination). If the control unit 205 determines that the job can be executed, the process proceeds to step S4. As described, the control unit 205 controls the print unit 203 and the sheet processing apparatus 200 to execute printing and post-processing of the job and then the process proceeds to step S1.

On the other hand, if the control unit 205 determines in step S3 that the execution of the job (execution of all post-processing set for the job) is impossible, the process proceeds to step S5. In other words, if one type of post-processing setting is set for the job, the control unit 205 determines in step S3 whether or not the post-processing setting is executable. If it is determined that the job is executable, the process proceeds to step S4. If the control unit 205 determines that the job is unexecutable, the process proceeds to step S5. Meanwhile, in step S3, if a plurality of types of post-processing setting are set for the job, the control unit 205 determines whether the plurality of types of post-processing include at least one unexecutable post-process. If there is no unexecutable post-processing in the plurality of types of post-processing, the process proceeds to step S4. If there is an unexecutable post-process in the plurality of types of post-processing, the process advances to step S5. The control unit 205 determines in step S5 whether or not the job includes a plurality of types of post-processing setting. If the control unit 205 determines that the job does not include a plurality of types of post-processing, the process proceeds to step S6. For example, this is equivalent to a case in which only the stapling process is set as the post-processing for the job, and there is no staple for use in stapling. In that case, the control unit 205 suspends the entire job in step S6.

On the other hand, if the control unit 205 determines that the job includes a plurality of types of post-processing in step S5, the process proceeds to step S7 and the control unit 205 determines the setting of a unit of promotion. The promotion is an act of suspending (retracting) a job that cannot be executed for some reasons if there is another job that can be executed and executing the executable job first. In the promotion of the present embodiment, when a first post-process that cannot be executed for some reason is set for printed sheets in a job, a post-process executable for the sheets can be executed first if an executable second post-process is set for another printed sheets of the job. This can be performed only if the order of the first post-process for sheets and the second post-process for another sheets can be switched. There can be a method in which the user sets the unit of promotion in advance. To perform the setting, the print apparatus 100 comprises a user interface using the touch panel unit 401 arranged on the console unit 204.

The unit of performing the promotion is set, for example, as follows.

When the user mode button 403 (FIG. 4) of the console unit 204 is pressed, the control unit 205 displays a screen for setting the system related to the print system 1000 on the touch panel unit 401.

Figure 8:
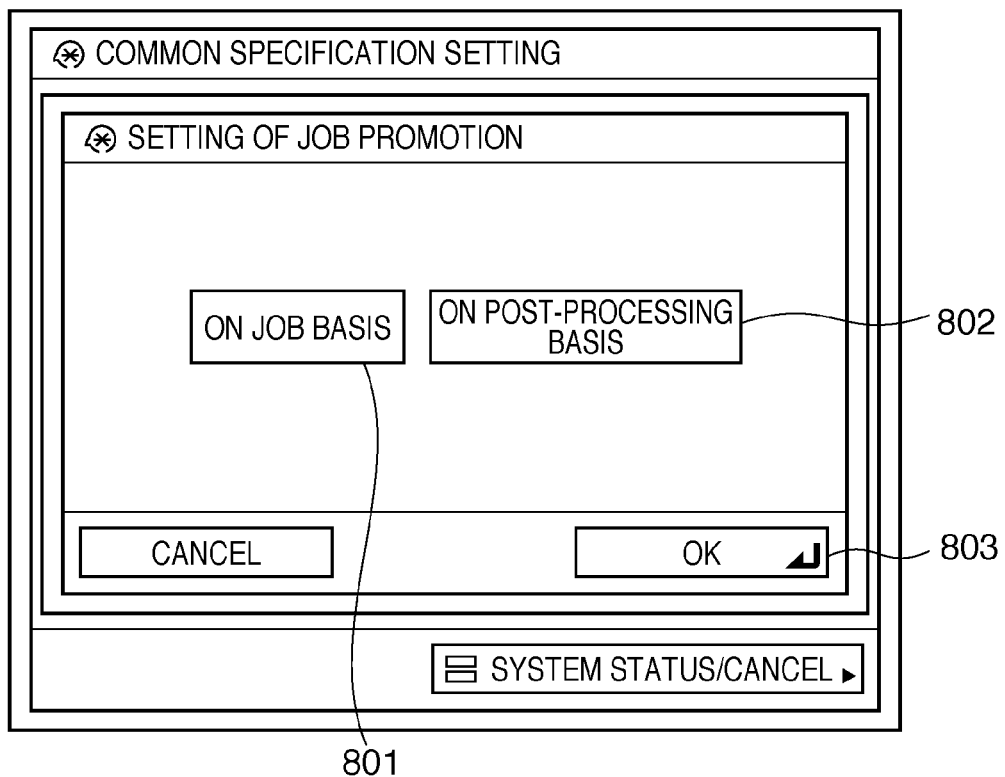
FIG. 8 is a diagram showing an example of a setting screen displayed on a touch panel unit.

FIG. 8 is a diagram illustrating an example of display of the screen for setting the system displayed on the touch panel unit 401 of the console unit 204.

In the embodiment, the system setting values are stored in the HDD 209, and the setting values are held even if the power is turned off. The UI screen displays a setting button 801 for the user to set the promotion on a job basis and a setting button 802 for the user to set the promotion on a post-processing basis. If an OK button 803 is pressed after one of the buttons is selected, the control unit 205 writes the setting values in the HDD 209.

The control unit 205 checks the setting in step S7 and determines whether to perform the promotion on a job basis or on a post-processing basis.

There can be a configuration in which the user determines the setting of the unit for performing the promotion at necessary timing after the execution of the job. In that case, if the control unit 205 determines in step S5 that the job includes a plurality of types of post-processing, the control unit 205 displays a warning screen as shown in FIG. 9 on the touch panel unit 401 arranged on the console unit 204 to request the user for an instruction.

Figure 9:
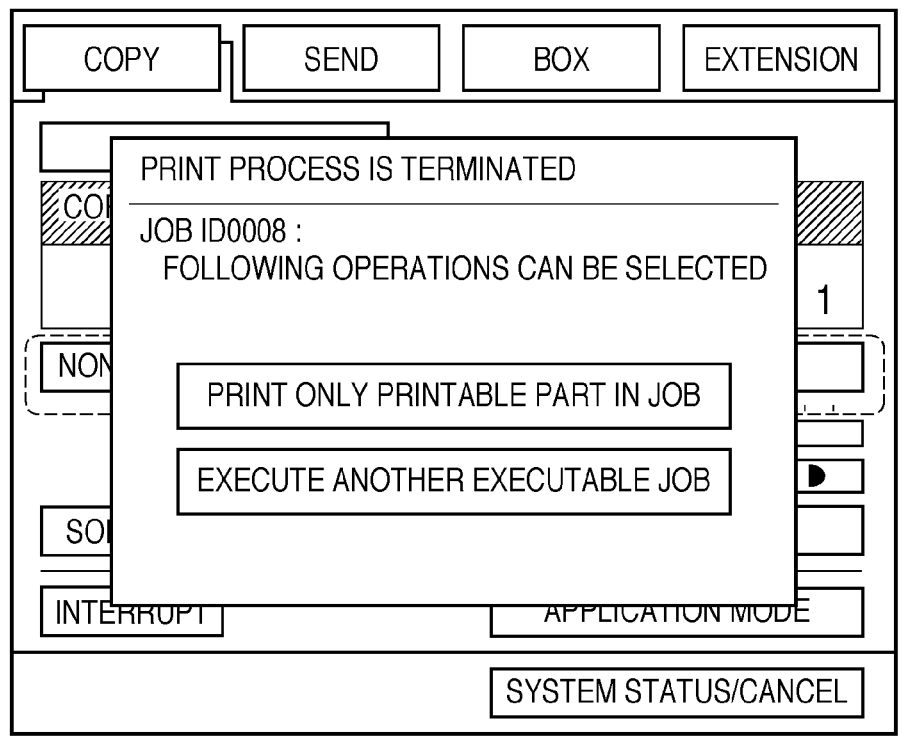
FIG. 9 is a diagram showing an example of a screen, displayed on the touch panel unit, for designating a promoting operation.

FIG. 9 is a diagram illustrating an example of screen for designating an operation for promotion displayed on the touch panel unit 401 of the console unit 204.

The print process of a job is terminated, and one of "PRINT ONLY PRINTABLE PART IN JOB" and "EXECUTE ANOTHER EXECUTABLE JOB" can be selected.

The control unit 205 then receives the setting inputted by the user through the console unit 204 to determine whether to perform the promotion on a job basis or on a post-processing basis.

If the control unit 205 determines in step S7 that the setting is for the job-by-job promotion, the process proceeds to step S6 and the control unit 205 suspends the entire job.

On the other hand, if the control unit 205 determines in step S7 that the promotion setting is for the promotion on a post-processing basis, the process proceeds to step S8 and the control unit 205 divides the job into blocks of post-processing. The process proceeds to step S9 and the control unit 205 suspends (retracts) the blocks of post-processing determined to be unexecutable. The control unit 205 causes the HDD 209 to hold the setting for executing the print process corresponding to the block of post-processing determined to be unexecutable and the post-processing. When the reasons (such as no staples) that the unexecutable job cannot be executed are solved and the unexecutable job can be executed, an instruction for restarting the execution of the suspended block of post-processing can be received. For example, the console unit 204 or a console unit of an external apparatus functions as an instruction reception unit. When the instruction from the user is received, the control unit 205 executes the block of post-processing based on the setting information held in the HDD 209. This allows the user to execute the suspended block of post-processing later. In step S10, the control unit 205 further identifies an executable block other than the suspended block of post-processing. If there is an executable block, the process proceeds to step S11, and the printing corresponding to the block of post-processing or the post-processing is executed. The repetition of the process allows the continuation of printing corresponding to the executable block of post-processing and the continuation of only executable post-processing in the job without suspending the execution of the job. In step S10, the order of post-processing may be a problem, and the order may not be maintained as well as upon the identification of the executable block. Therefore, in that case, it is preferable to suspend (prohibit) the execution of a next post-processing until a post-process preceding the next post-process has been executed.

As described, according to the first embodiment, a job including a plurality of post-processes is received. If the job is suspended for some reasons, an executable post-process among the post-processes included in the job can be executed (promoted). A post-process that cannot be executed is suspended.

The user can select whether to perform the promotion on a post-processing basis in the job, or on a job basis.

A second embodiment of the present invention will now be described. The second embodiment describes a case for which the restart of the execution of a suspended block of post-processing is instructed. The configurations of the print system and the print apparatus according to the second embodiment are the same as in the first embodiment, and the description will not be repeated.

In the case here, the restart of the execution of the suspended block of post-processing is instructed after the process described with reference to the flow chart of FIG. 7.

Figure 10:
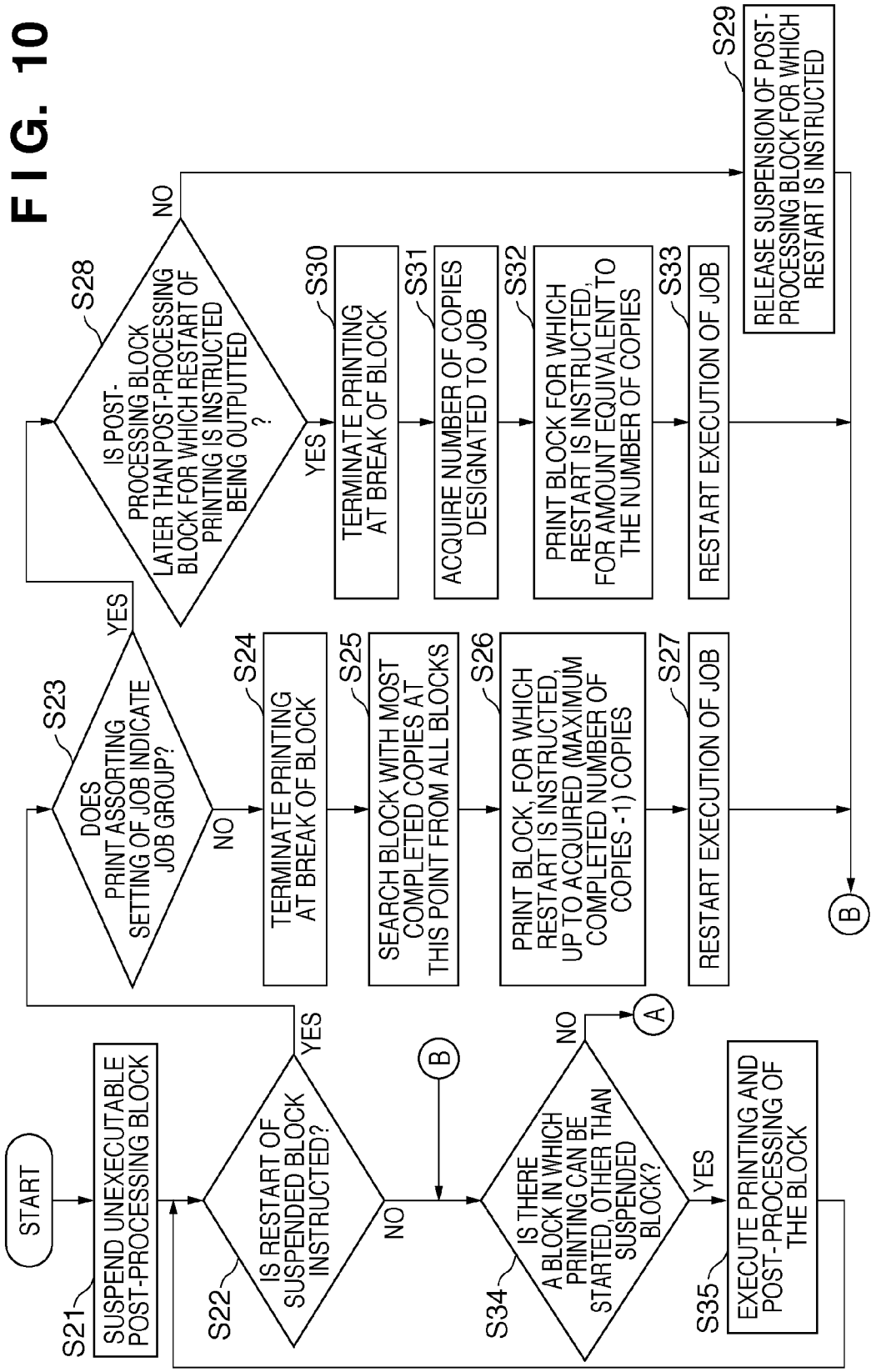
FIG. 10 is a flow chart describing a process executed by the control unit of the print apparatus according to a second embodiment.

FIG. 10 is a flow chart describing a process by the control unit 205 of the print apparatus of the print system according to the second embodiment. The program for executing the process is stored in the ROM 207 or installed in the HDD 209. If the program is installed in the HOD 209, the program is loaded to the RAM 208 for execution. The process is illustrated as a process after step S9 of FIG. 7.

In step S21, the control unit 205 suspends a block of post-processing determined to be unexecutable, as in step S9 of FIG. 7. The process proceeds to step S22 and the control unit 205 determines whether or not the restart of the suspended block of post-processing is instructed during printing of an executable block. The execution restart instruction for the suspended block of post-processing in the print system 1000 will now be described.

Figure 11:
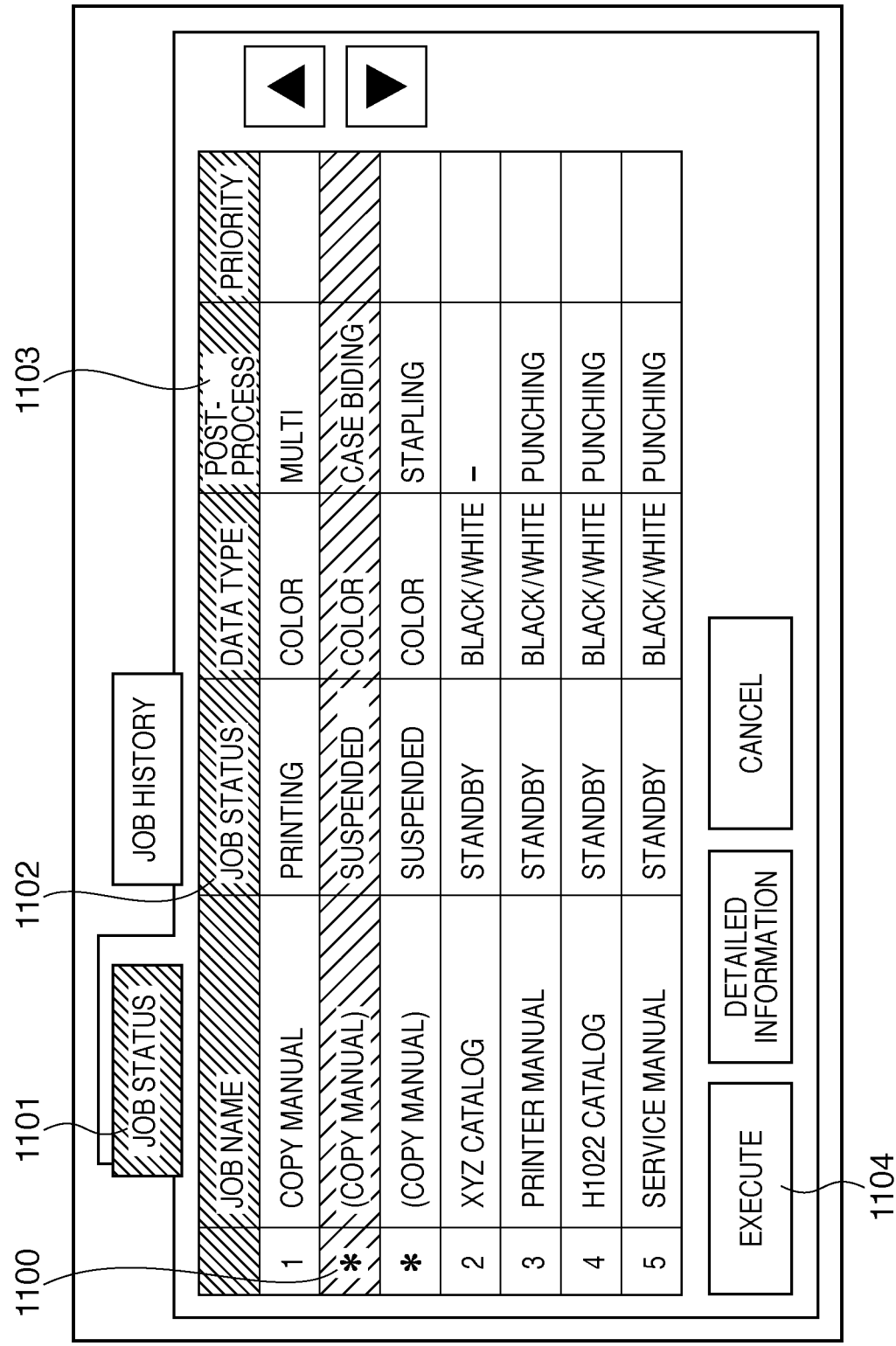
FIG. 11 is a diagram showing an example of screen for displaying a job status of the print system according to the second embodiment.

When the user presses the system status button 404 (FIG. 4) of the console unit 204, the control unit 205 displays a screen as shown in FIG. 11 on the touch panel unit 401 of the console unit 204.

FIG. 11 is a diagram illustrating an example of screen for displaying a job status of the print system 1000 according to the second embodiment of the present invention.

The screen displays information related to the currently executed job and information related to finished jobs. FIG. 11 shows a state in which a job status tab 1101 is selected, and information related to the currently executed job is displayed. The screen includes a field (job status) 1102 for displaying the current state of each job and a (post-processing) field 1103 for displaying set post-processing. The suspended jobs and post-processing blocks are displayed as "SUSPENDED" in the job status field 1102. When the user selects a job on the screen, the control unit 205 reverses and displays the line of the job on the touch panel unit 401 as shown with reference numeral 1100. When the user further presses the execution button 1104 in this condition, the control unit 205 determines that the restart of the selected job (copy manual) and block of post-processing (case binding) is instructed.

If the control unit 205 determines in step S22 that the restart of the suspended block of post-processing is instructed using the screen of FIG. 11, the process proceeds to step S23. Otherwise, the process proceeds to step S34. In step S34, the control unit 205 determines whether or not there is an executable block other than the suspended block of post-processing. If the control unit 205 determines that there is an executable block, the process proceeds to step S35 and the control unit 205 performs the printing of the block of post-processing and the post-processing.

Meanwhile, if the restart is instructed, the control unit 205 determines in step S23 whether the setting of output assorting set to the processed job is group output or collate output. The collate output is an output method of printing the entire sheets copy by copy and arranging sheets of each copy in order of pages when a plurality of copies of sheets are printed. For example, to print seven copies, each of ten-page printed sheets, the first to tenth pages of the first copy are first printed, and then the first to tenth pages of the second copy are printed. This is repeated up to the seventh copy. The group output is a method of outputting prints equivalent to the number of copies set for each page when a plurality of copies are printed. For example, to print seven copies, each of ten-page printed sheets, seven copies of the first page are printed first, and then seven copies of the second page are printed. This is repeated up to the tenth page. If the control unit 205 determines that the collate output is set, the process proceeds to step S24 and the control unit 205 stops the printing of the currently executed block of post-processing at a break of the block of post-processing. The process then proceeds to step S25 and the control unit 205 searches a block of post-processing with the most completed copies at this point from all post-processing blocks. The process proceeds to step S26 and the control unit 205 performs printing and post-processing of the blocks of post-processing, for which the restart is instructed, up to the copies of the block of post-processing searched in step S25 (maximum number of completed copies—1). The control unit 205 proceeds to step S27 and starts the entire execution process of job.

Meanwhile, if the control unit 205 determines that the group output is set in step S23, the process proceeds to step S28 and the control unit 205 determines whether or not a block of post-processing later than the block of post-processing, for which the restart of execution is instructed, is being outputted. If a block of post-processing before the block of post-processing, for which the start of execution is instructed, is being outputted, the process proceeds to step S29 and the control unit 205 releases the suspended state of the block of post-processing, for which the restart is instructed. The process proceeds to step S34 and the control unit 205 continues processing the currently processed block of post-processing.

On the other hand, if a block of post-processing later than the block of post-processing, for which the start of execution is instructed, is being outputted, the process proceeds from step S28 to step S30. In the same way as during the collation (step S24), the control unit 205 stops the printing of the block of currently executed post-processing at a break of the block of post-processing. The process proceeds to step S31 and the control unit 205 acquires the number of copies set to the job. The process proceeds to step S32 and the control unit 205 performs printing and post-processing of blocks of post-processing, for which the restart is instructed, up to the number of copies acquired in step S31. The process proceeds to step S33 to restart the entire execution process of job and proceeds to step S34.

Figure 12:
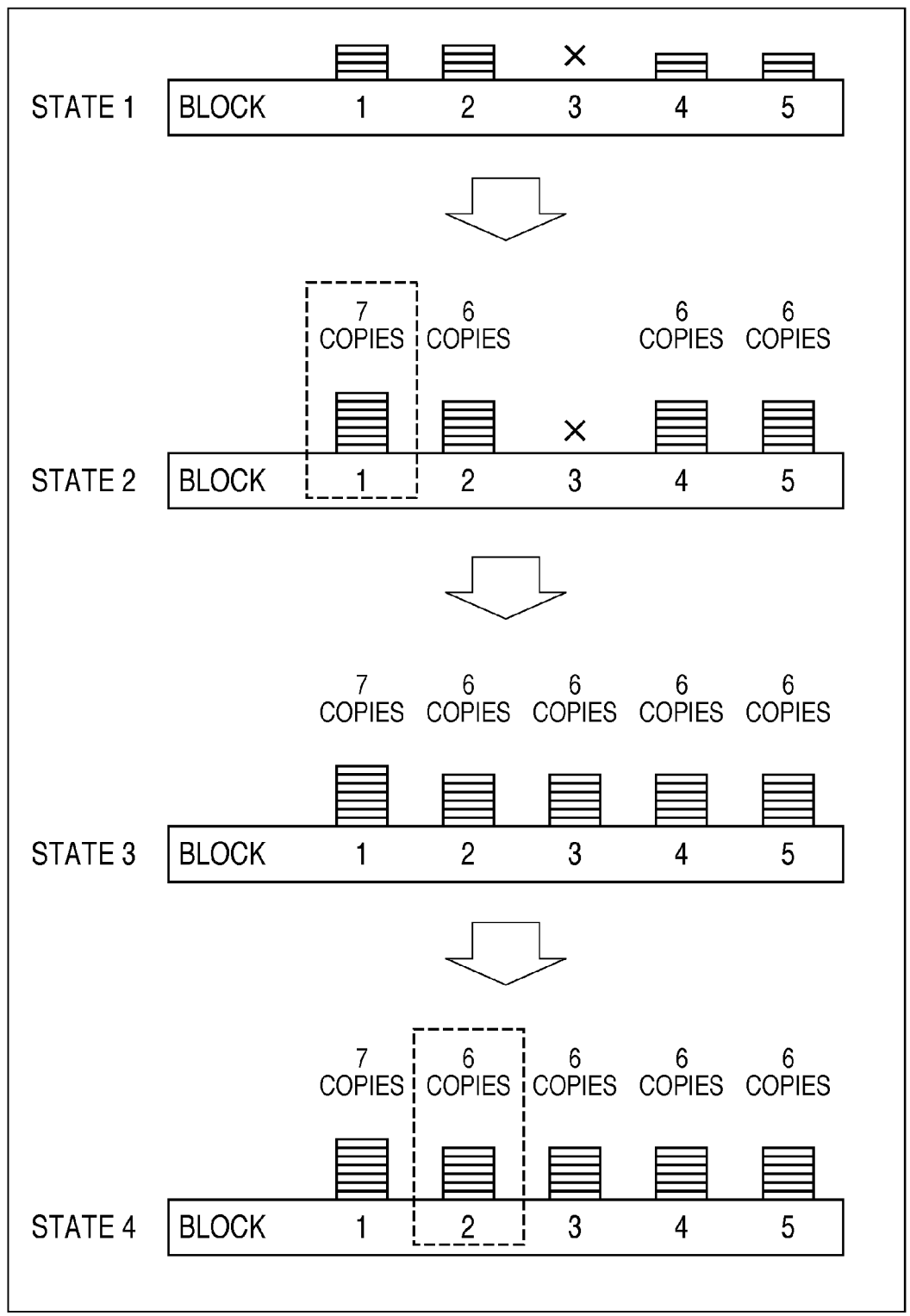
FIG. 12 is a diagram describing a suspended area restart operation during collate output according to the second embodiment.

An object of these operations is to realize an operation as described in FIG. 12.

FIG. 12 is a diagram describing a restart operation of a suspended part during the collate output according to the second embodiment. In the case of the collate output, the control unit 205 first outputs the first copy for an amount of executable blocks in order from the first page of the first block and then outputs the second copy in order from the first page of the first block.

The case that the collate output is set will be described first. A state 1 of FIG. 12 is a state in which a block 3 of post-processing is determined to be unexecutable for some reasons in a job made of five blocks of post-processing in the entire job, and the block 3 of post-processing is suspended. The execution of other blocks of post-processing continues.

It is assumed that the restart of printing of the block 3 of post-processing is instructed during the execution of processing based on the block 1 of post-processing (S22). The output status at this point indicates that the seventh copy of the block 1 of post-processing is being outputted. The control unit 205 waits for the completion of printing of the seventh copy of the block 1 of post-processing to terminate printing (state 2) (S24). In this state, the print process and post-processing of up to the seventh copy are executed for the block 1 of post-processing.

The maximum number of completed copies at this point is seven in the block 1 of post-processing (S25). Therefore, the control unit 205 performs the output based on the block 3 of post-processing up to (7−1) "6 copies" (predetermined amount) (state 3) (S26).

When the output of six copies based on the block 3 of post-processing is finished, the state enters a state 4, and the printing is restarted including the block 3 of post-processing (S27). The printing restarts from the block 2 of post-processing. In this way, the numbers of copies of printed sheets can be processed.

The case that the group output is set will now be described.

Figure 13:
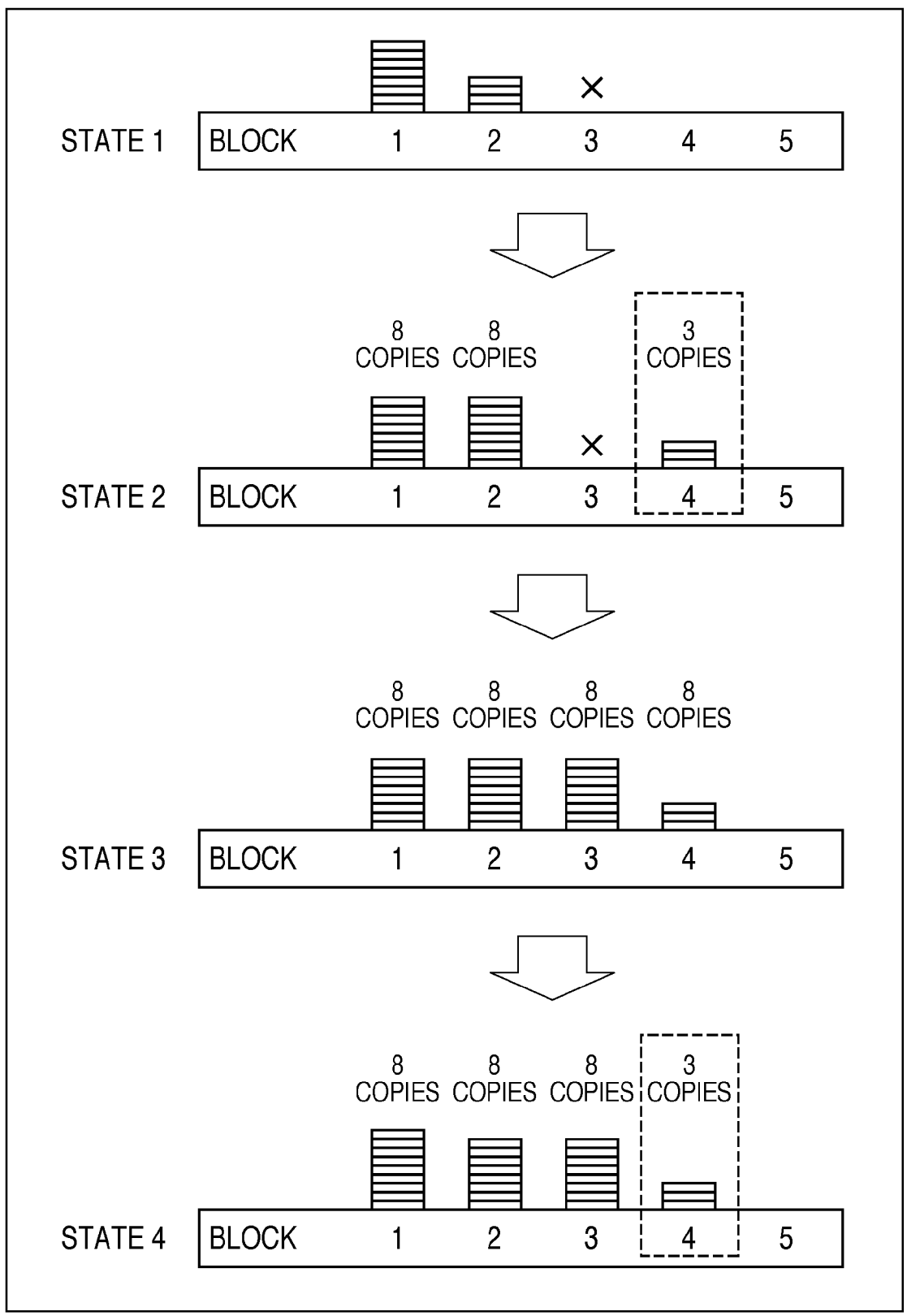
FIG. 13 is a diagram describing a suspended area restart operation during group output according to the second embodiment.

FIG. 13 is a diagram describing a restart operation of a suspended part during the group output according to the second embodiment. In the case of the group output, the control unit 205 first outputs the first page for an amount corresponding to the number of copies and then outputs the second page for an amount corresponding to the number of copies. The control unit 205 repeats this for the number of times equivalent to the number of pages included in the executable block.

A state 1 of FIG. 13 illustrates an example of a situation in which the block 3 of post-processing is determined to be unexecutable for some reasons in a job made of five blocks of post-processing in the entire job, the block 3 is suspended, and the execution of other blocks of post-processing continues. The number of copies set to the job is eight.

In a state 2, it is assumed that the restart of printing of the block 3 of post-processing is instructed during the output of the block 4 of post-processing (S22). At this point, the block 4 of post-processing is outputting the third copy. Since a post-processing block later than the block 3 of post-processing, for which the restart of printing is instructed, is being outputted, the control unit 205 waits the block 4 of post-processing to complete outputting the third copy and terminates printing (state 2) (S30).

In a state 3, the control unit 205 outputs the block 3 of post-processing up to eight copies which correspond to the number of copies set for the job (S32).

In a state 4, the control unit 205 restarts the printing from the block 4 of post-processing when the output of the block 3 of post-processing is eight copies (S33). In this way, the number of copies of sheets can be processed.

If another job, to which a plurality of types of post-processing are set, is newly executed in a case that there is a suspended block of post-processing, it is complicated when the number of suspended blocks increases in the blocks of post-processing. To prevent this, the control unit 205 may control to execute only executable jobs other than the jobs including the plurality of types of post-processing if there is already a suspended block of post-processing.

In this way, the control unit 205 restarts the suspended print process and post-processing in accordance with the print restart instruction. The control unit 205 preferentially executes the suspended printing process and post-processing until the amount of product based on the print process and post-processing is equivalent to or at least close to (−1 here) the amount of product based on the already executed post-processing or the print process corresponding to the post-processing.

FIG. 14 shows a flow of the case.

FIG. 14 is a flow chart describing a process of job reception means when there is a suspended post-processing block according to the second embodiment. The program for executing the process is stored in the ROM 207 or installed in the HDD 209. If the program is installed in the HDD 209, the control unit 205 loads the program to the RAM 208 for execution.

The control unit 205 first determines in step S41 whether or not there is a suspended block of post-processing in the print system 1000. If the control unit 205 determines in step S41 that there is no suspended block of post-processing, the process proceeds to step S43 and the control unit 205 determines whether or not there is a received job, as in step S1 of FIG. 7. If there is a received job, the process proceeds to step S3 (FIG. 7) and proceeds to the process of determining whether or not the job can be executed.

On the other hand, if the control unit 205 determines that there is a suspended block of post-processing, the process proceeds from step S41 to step S42. In step S42, the control unit 205 excludes the jobs including a plurality of types of post-processing settings from the execution target and determines whether or not there is a received job other than the jobs. If there is a received job other than the jobs, the process proceeds to the process of checking whether or not the job can be executed (S3 of FIG. 7).

As a result of the control, the user can set a plurality of post-processes to one job to output the printed sheets, to which the plurality of types of post-processing are set, at once as much as possible. The user can set to apply a plurality of types of post-processes to one job and can first process sheets, to which executable post-processing is set, even if some of the post-processes cannot be executed. Furthermore, the user can set to perform the promotion on a post-processing basis or on a job basis, and the convenience is improved.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-114978, filed May 11, 2009, which is hereby incorporated by reference herein in its entirety.

The invention claimed is:

1. A print apparatus comprising:
   a reception unit configured to receive a job including a setting for a plurality of types of post-processes which are executed for printed sheets printed by the print apparatus;
   a determination unit configured to determine whether or not there is an unexecutable post-process in the plurality of types of post-processes set for the job received by the reception unit; and
   a control unit configured to, if the determination unit determines that there is the unexecutable post-process, hold, in a holding unit, information for executing a print process corresponding to the unexecutable post-process for executing and the unexecutable post-process, and control to execute a print process corresponding to an executable post-process and the executable post-process prior to the print process corresponding to the unexecutable post-process and the unexecutable post-process.

2. The print apparatus according to claim 1, further comprising:
   a setting unit configured to set to execute an executable print process or post-processing on a job basis or on a post-process basis, if the determination unit determines that there is the unexecutable post-process,
   wherein if the setting unit sets to execute the executable print process or post-process on a post-processing basis, the control unit holds, in the holding unit, information for executing the print process corresponding to the unexecutable post-process and for executing the unexecutable post-process, and controls to execute the print process corresponding to the executable post-process and the executable post-process prior to the print process corresponding to the unexecutable post-process and the unexecutable post-process.

3. The print apparatus according to claim 1, further comprising:
   a selection unit configured to select whether or not to execute a print process corresponding to the executable post-process and the executable post-process,
   wherein if the selection unit selects to execute the print process corresponding to the executable post-process and the executable post-process, the control unit executes the print process corresponding to the executable post-process and the executable post-process.

4. The print apparatus according to claim 1, further comprising:
   an instruction receiving unit configured to receive an instruction for executing the print process corresponding to the unexecutable post-process and for executing the unexecutable post-process,
   wherein if the instruction receiving unit receives the instruction after the unexecutable post-process becomes executable, the control unit controls to execute the print process corresponding to the post-process which becomes executable and the post-process which becomes executable.

5. The print apparatus according to claim 4, wherein the control unit preferentially executes the print process corresponding to the post-process which becomes executable and the post-process which becomes executable until an amount of printed sheets printed by the print apparatus corresponding to the post-process which becomes executable and of printed sheets to be processed by the post-process which becomes executable is equivalent to a predetermined amount based on an amount of printed sheets printed by the print apparatus corresponding to the executed post-process corresponding to the job received by the reception unit and of printed sheets processed by the executed post-process.

6. The print apparatus according to claim 1,
   wherein after the unexecutable post-process becomes executable, the control unit controls to execute the print process corresponding to the post-process which becomes executable and the executable post-process which becomes executable.

7. A method of controlling a print apparatus, comprising:
a reception step of receiving a job including a setting for a plurality of types of post-processes which are executed for printed sheets printed by the print apparatus;
a determination step of determining whether or not there is an unexecutable post-process in the plurality of types of post-processes set for the job received in the reception step; and
a control step of, if it is determined in the determination step that there is the unexecutable post-process, holding, in a holding unit, information for executing a print process corresponding to the unexecutable post-process and for executing the unexecutable post-process, and controlling to execute a print process corresponding to an executable post-process and the executable post-process prior to the print process corresponding to the unexecutable post-process and the unexecutable post-process.

8. A non-transitory computer-readable storage medium storing a computer program for causing a computer to execute the method of controlling the print apparatus according to claim 7.

* * * * *